United States Patent
Haga et al.

(10) Patent No.: US 11,942,641 B2
(45) Date of Patent: Mar. 26, 2024

(54) METHOD FOR PRODUCING CARBONACEOUS SUBSTANCE-COATED GRAPHITE PARTICLES

(71) Applicants: JFE CHEMICAL CORPORATION, Tokyo (JP); SUMITOMO BAKELITE CO., LTD., Tokyo (JP)

(72) Inventors: Ryuta Haga, Tokyo (JP); Motoharu Obika, Tokyo (JP); Kunihiko Eguchi, Tokyo (JP); Yoshikazu Kobayashi, Tokyo (JP); Masakatsu Asami, Tokyo (JP)

(73) Assignees: JFE Chemical Corporation, Tokyo (JP); Sumitomo Bakelite Co., Ltd., Tokyo (JP)

( * ) Notice: Subject to any disclaimer, the term of this patent is extended or adjusted under 35 U.S.C. 154(b) by 0 days.

(21) Appl. No.: 17/430,430

(22) PCT Filed: Nov. 9, 2020

(86) PCT No.: PCT/JP2020/041721
§ 371 (c)(1),
(2) Date: Aug. 12, 2021

(87) PCT Pub. No.: WO2021/260964
PCT Pub. Date: Dec. 30, 2021

(65) Prior Publication Data
US 2023/0107067 A1  Apr. 6, 2023

(30) Foreign Application Priority Data

Jun. 26, 2020  (JP) .................................. 2020-110143

(51) Int. Cl.
*H01M 4/583* (2010.01)
*H01M 4/04* (2006.01)
(Continued)

(52) U.S. Cl.
CPC .......... *H01M 4/583* (2013.01); *H01M 4/0471* (2013.01); *H01M 4/625* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| 6,403,259 | B1 | 6/2002 | Kitagawa et al. |
| 2007/0092428 | A1 | 4/2007 | Sotowa et al. |

(Continued)

FOREIGN PATENT DOCUMENTS

| CN | 1227004 A | 8/1999 |
| CN | 106531979 A | 3/2017 |

(Continued)

OTHER PUBLICATIONS

English translation of JP2016164861 (Year: 2019).*
(Continued)

*Primary Examiner* — Yoshitoshi Takeuchi
(74) *Attorney, Agent, or Firm* — Buchanan Ingersoll & Rooney, PC (57) ABSTRACT

Resin-adhered graphite particles are obtained by causing a modified novolac-type phenolic resin to adhere to graphite particles. At least part of surfaces of the graphite particles is coated with a carbonaceous coating by heating the resin-adhered graphite particles in a non-oxidizing atmosphere at 900 to 1,500° C. to carbonize the modified novolac-type phenolic resin. Arylene groups having hydroxy groups account for 5 to 95 mol % of arylene groups constituting the modified novolac-type phenolic resin. The obtained carbonaceous substance-coated graphite particles exhibit excel- (Continued)

lent battery properties when used as a negative electrode material for a lithium ion secondary battery.

3 Claims, 1 Drawing Sheet

(51) Int. Cl.
*H01M 4/62* (2006.01)
*H01M 4/02* (2006.01)

(56) References Cited

U.S. PATENT DOCUMENTS

| | | | |
|---|---|---|---|
| 2013/0040203 A1 | 2/2013 | Yoon et al. | |
| 2014/0227522 A1* | 8/2014 | Sasaki | H01M 4/583 252/182.1 |
| 2015/0017539 A1 | 1/2015 | Ito et al. | |

FOREIGN PATENT DOCUMENTS

| | | |
|---|---|---|
| JP | 11199211 A | 7/1999 |
| JP | 2000191310 A | 7/2000 |
| JP | 2000215896 A | 8/2000 |
| JP | 2013515349 A | 5/2013 |
| JP | 2013219023 A | 10/2013 |
| JP | 2016004691 A | 1/2016 |
| JP | 2016/164861 * 9/2016 | ............ C08G 61/02 |
| JP | 2016164861 A | 9/2016 |
| JP | 2018163868 A | 10/2018 |
| WO | 2004056703 A1 | 7/2004 |

OTHER PUBLICATIONS

European Search Report for European Application No. 20 914 771.9, dated Feb. 14, 2022, 7 pages.
Korean Office Action for Korean Application No. 10-2021-7025855, dated Nov. 24, 2021, 3 pages.
Extended European Search Report for European Application No. 21 194 315.4, dated Dec. 7, 2021, 7 pages.
International Search Report and Written Opinion for International Application No. PCT/JP2020/041721, dated Jan. 19, 2021, with partial translation, 13 pages.
Non Final Office Action for U.S. Appl. No. 17/468,890, dated Aug. 25, 2023, 25 pages.
Final Office Action for U.S. Appl. No. 17/468,890, dated Oct. 16, 2023, 11 pages.

* cited by examiner

METHOD FOR PRODUCING CARBONACEOUS SUBSTANCE-COATED GRAPHITE PARTICLES

CROSS REFERENCE TO RELATED APPLICATIONS

This is the U.S. National Phase application of PCT/JP2020/041721, filed Nov. 9, 2020, which claims priority to Japanese Patent Application No. 2020-110143, filed Jun. 26, 2020, the disclosures of these applications being incorporated herein by reference in their entireties for all purposes.

FIELD OF THE INVENTION

The present invention relates to a method for producing carbonaceous substance-coated graphite particles.

BACKGROUND OF THE INVENTION

Patent literature 1 discloses "a method for producing a carbon material for a negative electrode active material including: a coating step of mixing graphite powder and a solid novolac resin, thereafter softening the novolac resin and applying a shear force to coat the graphite powder, thereby forming granulated powder with the novolac resin; a heat treatment step of subjecting the granulated powder to heat treatment in an oxygen-containing atmosphere to obtain heat-treated powder; and a firing step of firing the heat-treated powder in an inert gas atmosphere, thereby obtaining a carbon material for a negative electrode active material" (claim 1).

PATENT LITERATURES

Patent Literature 1: JP 2016-4691 A

SUMMARY OF THE INVENTION

The present inventors used carbonaceous substance-coated graphite particles produced by a conventional method as a negative electrode material for a lithium ion secondary battery. As a result, it was discovered that the battery properties (such as the initial charging-discharging efficiency and the cycle characteristic) would be insufficient in some cases.

Accordingly, aspects of the present invention have an object to obtain carbonaceous substance-coated graphite particles that exhibit excellent battery properties when used as a negative electrode material for a lithium ion secondary battery.

The present inventors have made intensive studies to achieve the above-described object and found that, when carbonaceous coating is formed using a particular novolac-type phenolic resin, a specific fine structure can be obtained, resulting in excellent battery properties; aspects of the invention have been thus completed.

Specifically, aspects of the present invention provide the following [1] to [9].

[1] A method for producing carbonaceous substance-coated graphite particles, the method comprising: obtaining resin-adhered graphite particles by causing a modified novolac-type phenolic resin to adhere to graphite particles; and coating at least part of surfaces of the graphite particles with a carbonaceous coating by heating the resin-adhered graphite particles in a non-oxidizing atmosphere at 900 to 1,500° C. to carbonize the modified novolac-type phenolic resin, wherein arylene groups having hydroxy groups account for 5 to 95 mol % of arylene groups constituting the modified novolac-type phenolic resin, and wherein in the carbonaceous substance-coated graphite particles, a particle diameter $D_{50}$ is 3.0 to 20.0 μm, a specific surface area determined by BET method is 4.0 to 15.0 m$^2$/g, a pore specific surface area SAa of pores having pore sizes of 1 to 4 nm determined by BJH method is 1.85 to 12.50 m$^2$/g, and a ratio of a pore specific surface area SAb of pores having pore sizes of 4 to 150 nm determined by BJH method to the pore specific surface area SAa (SAb/SAa) is 0.20 to 1.29.

[2] The method for producing carbonaceous substance-coated graphite particles according to [1] above, wherein the modified novolac-type phenolic resin is expressed by Formula (1) below:

[Chemical Formula 1]

(1)

where P represents an arylene group having a hydroxy group, X represents an arylene group having no hydroxy group, and m and n each independently represent an integer of 1 or more, with a value of m/(m+n) being 0.05 to 0.95.

[3] The method for producing carbonaceous substance-coated graphite particles according to [2] above, wherein the modified novolac-type phenolic resin is a xylene-modified novolac-type phenolic resin, in which P and X in Formula (1) represent a hydroxyphenylene group and a dimethylphenylene group, respectively.

[4] Carbonaceous substance-coated graphite particles including graphite particles and carbonaceous coating, which carbonaceous coating covers at least part of surfaces of the graphite particles, wherein a particle diameter $D_{50}$ is 3.0 to 20.0 μm, a specific surface area determined by the BET method is 4.0 to 15.0 m$^2$/g, a pore specific surface area SAa of pores having pore sizes of 1 to 4 nm determined by the BJH method is 1.85 to 12.50 m$^2$/g, and a ratio of a pore specific surface area SAb of pores having pore sizes of 4 to 150 nm determined by the BJH method to the pore specific surface area SAa (SAb/SAa) is 0.20 to 1.29.

[5] The carbonaceous substance-coated graphite particles according to [4] above, wherein an amount of the carbonaceous coating is 0.1 to 15.0 parts by mass with respect to 100 parts by mass of the graphite particles.

[6] The carbonaceous substance-coated graphite particles according to [4] or [5] above, wherein an average interplanar spacing $d_{002}$ is not more than 0.3370 nm, and a Raman R value is not more than 0.50.

[7] The carbonaceous substance-coated graphite particles according to any one of [4] to [6] above, serving as a negative electrode material for a lithium ion secondary battery.

[8] A negative electrode for a lithium ion secondary battery comprising the carbonaceous substance-coated graphite particles according to any one of [4] to [6] above.

[9] A lithium ion secondary battery comprising the negative electrode according to [8] above.

According to aspects of the invention, it is possible to obtain carbonaceous substance-coated graphite particles that exhibit excellent battery properties when used as a negative electrode material for a lithium ion secondary battery.

DETAILED DESCRIPTION OF EMBODIMENTS OF THE INVENTION

Figure 1:
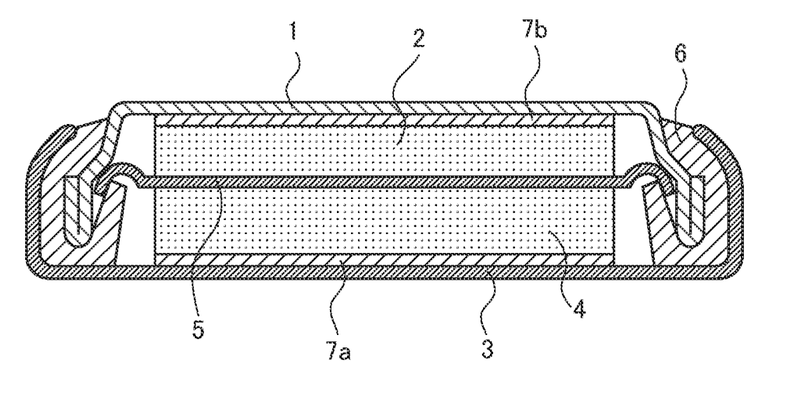
The FIGURE is a cross section of a battery for evaluation prepared for battery property evaluation.

In the description, a range expressed using the form of "(numeral) to (another numeral)" should read as a range including both ends defined by the numerals. For example, a range expressed as "A to B" includes A and B.

[Carbonaceous Substance-coated Graphite Particles]

Carbonaceous substance-coated graphite particles according to aspects of the invention include graphite particles and carbonaceous coating, which carbonaceous coating covers at least part of surfaces of the graphite particles, wherein a particle diameter $D_{50}$ is 3.0 to 20.0 μm, a specific surface area determined by the BET method is 4.0 to 15.0 m$^2$/g, a pore specific surface area SAa of pores having pore sizes of 1 to 4 nm determined by the BJH method is 1.85 to 12.50 m$^2$/g, and a ratio of a pore specific surface area SAb of pores having pore sizes of 4 to 150 nm determined by the BJH method to the above pore specific surface area SAa (SAb/SAa) is 0.20 to 1.29.

When the carbonaceous substance-coated graphite particles according to aspects of the invention are used as a negative electrode material for a lithium ion secondary battery, battery properties such as the initial charging-discharging efficiency and the cycle characteristic are excellent.

<Particle Diameter $D_{50}$>

The particle diameter $D_{50}$ of the carbonaceous substance-coated graphite particles according to aspects of the invention is not less than 3.0 μm because a reaction with an electrolyte becomes small, leading to an excellent initial charging-discharging efficiency, and is preferably not less than 4.0 μm, more preferably not less than 5.0 μm, further preferably not less than 6.0 μm and particularly preferably not less than 7.0 μm because the foregoing effect is more excellent.

On the other hand, the particle diameter $D_{50}$ is not more than 20.0 μm because a specific surface area becomes large, leading to an excellent input-output property, and is preferably not more than 15.0 μm and more preferably not more than 10.0 μm because the foregoing effect is more excellent.

The particle diameter $D_{50}$ corresponds to a particle diameter at 50 vol % in a cumulative frequency distribution, that is, a particle diameter at 50% accumulation of the smaller particles by volume.

The particle diameter $D_{50}$ is determined using a laser diffraction particle size analyzer according to JIS Z 8825: 2013. In this process, an aqueous solution (solvent: ion exchanged water) containing 3 mass % of a surfactant (Triton X-100) is used as a dispersion medium.

<Specific Surface Area $S_{BET}$>

The specific surface area $S_{BET}$ of the carbonaceous substance-coated graphite particles according to aspects of the invention determined by the BET method is not less than 4.0 m$^2$/g because a reaction with an electrolyte is suppressed, leading to an excellent initial charging-discharging efficiency, and is preferably not less than 4.5 m$^2$/g, more preferably not less than 5.0 m$^2$/g, further preferably not less than 6.5 m$^2$/g and particularly preferably not less than 7.0 m$^2$/g because the foregoing effect is more excellent.

On the other hand, because of the similar reason, the specific surface area $S_{BET}$ is preferably not more than 15.0 m$^2$/g, more preferably not more than 13.0 m$^2$/g, further preferably not more than 12.5 m$^2$/g, and particularly preferably not more than 10.0 m$^2$/g.

The specific surface area $S_{BET}$ is determined through nitrogen gas adsorption according to JIS Z 8830:2013 (Determination of the specific surface area of powders (solids) by gas adsorption-BET method).

<Pore Specific Surface Area SAa of Pores Having Pore Sizes of 1 to 4 nm>

In the carbonaceous substance-coated graphite particles according to aspects of the invention, the pore specific surface area SAa of pores having pore sizes of 1 to 4 nm determined by the BJH method is a surface area derived from a coating (carbonaceous coating) formed of a modified novolac-type phenolic resin to be described later and is not less than 1.85 m$^2$/g, preferably not less than 3.00 m$^2$/g and more preferably not less than 4.00 m$^2$/g.

On the other hand, the pore specific surface area SAa is not more than 12.50 m$^2$/g because a reaction with an electrolyte is suppressed, leading to excellent initial charging-discharging efficiency and cycle characteristic, and is preferably not more than 12.00 m$^2$/g, more preferably not more than 11.00 m$^2$/g and further preferably not more than 10.00 m$^2$/g.

<Pore Specific Surface Area SAb of Pores Having Pore Sizes of 4 to 150 nm>

In the carbonaceous substance-coated graphite particles according to aspects of the invention, the pore specific surface area SAb of pores having pore sizes of 4 to 150 nm determined by the BJH method is preferably not less than 0.50 m$^2$/g, more preferably not less than 1.00 m$^2$/g, further preferably not less than 2.00 m$^2$/g and particularly preferably not less than 3.00 m$^2$/g because the initial charging-discharging efficiency and the cycle characteristic are more excellent.

On the other hand, because of the similar reason, the pore specific surface area SAb is preferably not more than 15.00 m$^2$/g, more preferably not more than 13.00 m$^2$/g, further preferably not more than 10.00 m$^2$/g, further more preferably not more than 8.00 m$^2$/g, particularly preferably not more than 7.00 m$^2$/g and most preferably not more than 5.00 m$^2$/g.

<Pore Specific Surface Area Ratio (SAb/SAa)>

In the carbonaceous substance-coated graphite particles according to aspects of the invention, a ratio of the pore specific surface area SAb to the pore specific surface area SAa (SAb/SAa) is not less than 0.20 because the initial charging-discharging efficiency and the cycle characteristic are excellent, and the ratio is preferably not less than 0.30 and more preferably not less than 0.35 because the foregoing effect is more excellent.

On the other hand, because of the similar reason, the ratio (SAb/SAa) is not more than 1.29, preferably not more than 1.27, more preferably not more than 1.10 and further preferably not more than 1.00.

The pore specific surface area SAa and the pore specific surface area SAb are determined from a nitrogen adsorption isotherm by the BJH method according to JIS Z 8831-2 (Analysis of mesopores and macropores by gas adsorption) and JIS Z 8831-3 (Analysis of micropores by gas adsorption). Determination starts from a relative pressure of $5 \times 10^{-7}$ Pa.

<Average Interplanar Spacing $d_{002}$>

The average interplanar spacing $d_{002}$ is an average interplanar spacing of a (002) plane, i.e., a lattice plane, and is determined by the X-ray diffraction method. The average interplanar spacing $d_{002}$ is an index indicative of crystallinity of a carbon material; a large value thereof indicates low crystallinity, while a small value thereof indicates high crystallinity.

When a carbonized material is heated, graphitization, that is, crystallization of the material progresses. As graphitization progresses, the crystal size (crystallite size) becomes large, and the average interplanar spacing $d_{002}$ approaches an ideal graphite crystal of 0.3354 nm (theoretical value).

The average interplanar spacing $d_{002}$ of the carbonaceous substance-coated graphite particles according to aspects of the invention is preferably not more than 0.3370 nm and more preferably not more than 0.3360 nm because high crystallinity is achieved.

Because of the similar reason, La(110) of the carbonaceous substance-coated graphite particles according to aspects of the invention is preferably not less than 100 nm and preferably not less than 150 nm.

La(110) represents a crystallite size in the "a" axis direction determined from the 110 diffraction line.

The average interplanar spacing $d_{002}$ and the La(110) are determined according to JIS R 7651:2007 (Measurement of lattice parameters and crystallite sizes of carbon materials).

<Raman R Value>

Raman spectroscopy is a technique to analyze the structure of a substance on a molecular level based on the Raman spectrum obtained by dispersing Raman-scattered light generated when a substance is irradiated with light.

In Raman spectrum of carbonaceous substance-coated graphite particles, a peak of the G band derived from the graphite structure is confirmed near 1580 cm$^{-1}$, and a peak of the D band that appears when symmetry is impaired due to introduction of a defect is confirmed near 1360 cm$^{-1}$.

A ratio of a peak intensity $I_D$ of the D band to a peak intensity $I_G$ of the G band ($I_D/I_G$) is called a Raman R value.

A small Raman R value indicates high crystallinity, while a large Raman R value indicates low crystallinity. The carbonaceous substance-coated graphite particles according to aspects of the invention have the Raman R value of preferably not more than 0.50, more preferably not more than 0.40 and further preferably not more than 0.25 because high crystallinity is achieved.

While the lower limit thereof is not particularly limited, the Raman R value is preferably not less than 0.10 and more preferably not less than 0.15.

The Raman R value is determined according to JIS K 0137:2010 (General rules for Raman spectrometry).

<Amount of Carbonaceous Coating>

An amount of carbonaceous coating is preferably not less than 0.1 parts by mass, more preferably not less than 0.3 parts by mass and further preferably not less than 0.5 parts by mass with respect to 100 parts by mass of graphite particles.

On the other hand, an amount of carbonaceous coating is preferably not more than 15.0 parts by mass, more preferably not more than 13.0 parts by mass, further preferably not more than 11.0 parts by mass, particularly preferably not more than 8.0 parts by mass and most preferably not more than 5.0 parts by mass with respect to 100 parts by mass of graphite particles.

An amount of carbonaceous coating in the carbonaceous substance-coated graphite particles is determined as described below.

First, a residual carbon ratio of a precursor of the carbonaceous coating (e.g., modified novolac-type phenolic resin to be described later) is determined. The residual carbon ratio is a ratio (unit: mass %) of a residual amount to a charge amount when the carbonaceous coating is formed with the precursor alone being applied with the same heating history as that of the carbonaceous substance-coated graphite particles.

An amount of carbonaceous coating is determined based on the determined residual carbon ratio of the precursor and an amount of addition to be described later.

For instance, a case where an amount of precursor having a residual carbon ratio of "34 mass %" to be added is "8.0 parts by mass" with respect to 100 parts by mass of graphite particles is discussed. In this case, an amount of carbonaceous coating in the carbonaceous substance-coated graphite particles to be obtained should be "2.7 parts by mass" (=8.0×0.34) with respect to 100 parts by mass of graphite particles.

[Method for Producing Carbonaceous Substance-coated Graphite Particles]

A method for producing carbonaceous substance-coated graphite particles according to aspects of the invention (hereinafter, also simply referred to as "production method according to aspects of the invention)" is a method for producing the above-described carbonaceous substance-coated graphite particles according to aspects of the invention, and the method includes obtaining resin-adhered graphite particles by causing a modified novolac-type phenolic resin to adhere to graphite particles, and coating at least part of surfaces of the graphite particles with a carbonaceous coating by heating the resin-adhered graphite particles in a non-oxidizing atmosphere at 900 to 1,500° C. to carbonize the modified novolac-type phenolic resin, wherein arylene groups having hydroxy groups account for 5 to 95 mol % of arylene groups constituting the modified novolac-type phenolic resin.

Below, the graphite particles and the modified novolac-type phenolic resin used in the production method according to aspects of the invention are first described, and thereafter respective steps in the production method according to aspects of the invention are described.

<Graphite Particles>

In the production method according to aspects of the invention, graphite particles are used as a raw material.

The graphite particles preferably have a spherical shape or an ellipsoidal shape. The average particle diameter ($D_{50}$) of the graphite particles is preferably 3 to 20 μm and preferably 5 to 18 μm. The specific surface area ($S_{BET}$) of the graphite particles is preferably not more than 12 m$^2$/g and more preferably not more than 10 m$^2$/g.

The graphite particles may be natural graphite particles or artificial graphite particles, while natural graphite particles are preferred because of high crystallinity and other reasons.

Use can be made of commercially available natural graphite particles that are processed into a spherical or ellipsoidal shape.

Natural graphite in another shape than a spherical or ellipsoidal shape (such as scale-like graphite) may be processed into a spherical or ellipsoidal shape and used.

Examples of the method of processing scale-like graphite include a method in which various types of scale-like graphite are mixed in the presence of a granulation assisting agent such as an adhesive or a resin, a method in which a mechanical external force is applied to various types of scale-like graphite without use of an adhesive, and a method in which the both methods are combined.

Among these, the method in which a mechanical external force is applied is preferred. Application of a mechanical external force to scale-like graphite involves mechanically pulverizing and granulating scale-like graphite and can granulate scale-like graphite into a spherical shape.

As an apparatus for pulverizing scale-like graphite, use can be made of, for example, a kneader such as a pressure kneader or a two-roll mill, and a pulverizing apparatus such as a rotating ball mill, Fluidized Bed Opposed Jet Mill (manufactured by Hosokawa Micron Corporation) or Current Jet (manufactured by Nisshin Engineering Inc.).

As an apparatus for granulating pulverized material (which may include an acute part on its surface) obtained by pulverizing scale-like graphite, use can be made of, for example, a granulating machine such as GRANUREX (manufactured by Freund Corporation), New-Gra Machine (manufactured by Seishin Enterprise Co., Ltd.), or AGGLO-MASTER (manufactured by Hosokawa Micron Corporation), and a shear compaction processor such as Hybridization (manufactured by Nara Machinery Co., Ltd.), Mechano Micros (manufactured by Nara Machinery Co., Ltd.), or MECHANO FUSION System (manufactured by Hosokawa Micron Corporation).

<Modified Novolac-Type Phenolic Resin>

The modified novolac-type phenolic resin used in accordance with aspects of the invention is a novolac-type phenolic resin having part of its skeleton being substituted with an arylene group having no hydroxy group.

In particular, arylene groups having hydroxy groups account for 5 to 95 mol % of arylene groups constituting the modified novolac-type phenolic resin.

The modified novolac-type phenolic resin used in accordance with aspects of the invention is preferably expressed by the following Formula (1).

[Chemical Formula 2]

(1)

In Formula (1), P represents an arylene group having a hydroxy group, X represents an arylene group having no hydroxy group, and m and n each independently represent an integer of 1 or more. Meanwhile, a value of $m/(m+n)$ is 0.05 to 0.95.

An example of an arylene group having a hydroxy group represented by P in Formula (1) is a divalent group derived from a phenol (i.e., residue from an aromatic ring constituting a phenol, from which two hydrogen atoms are removed).

While a phenol is not particularly limited, specific examples thereof include phenol; an alkyl-substituted phenol such as o-cresol, m-cresol, p-cresol, xylenol or p-t-butyl phenol; an aromatic-substituted phenol such as p-phenylphenol; a divalent phenol such as catechol or resorcinol; and naphthol such as α-naphthol or β-naphthol. Among these, phenol is preferred.

An example of an arylene group having no hydroxy group represented by X in Formula (1) is a divalent group derived from an aromatic hydrocarbon having no hydroxy group (i.e., residue from an aromatic ring constituting an aromatic hydrocarbon having no hydroxy group, from which two hydrogen atoms are removed).

While an aromatic hydrocarbon having no hydroxy group is not particularly limited, specific examples thereof include benzene, naphthalene, biphenyl and anthracene. These aromatic hydrocarbons may have a substituent different from a hydroxy group.

Examples of a substituent include an alkyl group such as a methyl group or an ethyl group; an alkenyl group such as a vinyl group or an allyl group; an amino group; and an aryl group such as a phenyl group. Among these, an alkyl group is preferred, and a methyl group is more preferred.

The number of substituents is not particularly limited and is preferably one or more, and more preferably two or more. While the upper limit thereof is not particularly limited and is appropriately selected depending on the number of aromatic rings or another factor, an example thereof is not more than four.

In a case where the number of substituents is two or more, these substituents may be all the same or different from one another.

P and X in Formula (1) may be, via a methylene group, alternately bonded or randomly bonded.

An integer of 1 or more represented by each of m and n in Formula (1) is not particularly limited and is appropriately selected depending on, for example, a weight average molecular weight (Mw) of the modified novolac-type phenolic resin expressed by Formula (1).

<<Unmodified Ratio>>

Meanwhile, the value of $m/(m+n)$ is set to meet 0.05 to 0.95.

Hereinbelow, the "value of $m/(m+n)$" is also referred to as an unmodified ratio. The unmodified ratio is preferably 0.20 to 0.90, more preferably 0.40 to 0.90, further preferably 0.40 to 0.85 and particularly preferably 0.60 to 0.80 because the carbonaceous substance-coated graphite particles according to aspects of the invention can be easily obtained.

A resin with an unmodified ratio satisfying the above range may be obtained by mixing resins having different unmodified ratios. In addition, a resin with an unmodified ratio satisfying the above range may be obtained by mixing a resin expressed by Formula (1) in which m is 0 with a resin expressed by Formula (1) in which n is 0.

The unmodified ratio is determined by obtaining a hydroxyl value through neutralizing titration according to JIS K 0070 (1992) and calculating m and n from proportions of the respective functional groups using the $^{13}$C NMR-NNE technique, having Formula (1) as a model structure.

<<Weight Average Molecular Weight>>

The weight average molecular weight of the modified novolac-type phenolic resin (in terms of polystyrene) is preferably 500 to 100,000, more preferably 600 to 100,000 further preferably 700 to 80,000 and more preferably 100 to 50,000 because the carbonaceous substance-coated graphite particles according to aspects of the invention can be easily obtained.

The weight average molecular weight is determined by measurement using gel permeation chromatography (GPC) under the following conditions.

(Measurement Conditions)

Apparatus: "HLC-8220" manufactured by TOSOH Corporation

Detector: "UV-8220" manufactured by TOSOH Corporation, set at wavelength of 280 nm Analysis column: "TSK-GEL Super HZ2000," "TSK-GEL Super HZ3000" and "TSK-GEL Super HZM-M" manufactured by TOSOH Corporation are each used Eluting solvent: tetrahydrofuran Column temperature: 40° C.

<<Xylene-Modified Novolac-Type Phenolic Resin>>

As the modified novolac-type phenolic resin expressed by Formula (1), a suitable example is xylene-modified novolac-type phenolic resin because the carbonaceous substance-coated graphite particles according to aspects of the invention can be easily obtained. In this case, P and X in Formula (1) represent a hydroxyphenylene group and a dimethylphenylene group, respectively.

The xylene-modified novolac-type phenolic resin can be obtained by, for example, reacting a phenol with xylene or a xylene-modified compound.

Xylene may be any of o-xylene, m-xylene and p-xylene.

A xylene-modified compound may be any of an o-xylene-modified compound, an m-xylene-modified compound and a p-xylene-modified compound. While a xylene-modified compound is not particularly limited, an example thereof is a compound in which plural xylenes are linearly crosslinked via a methylene group and/or an ether bond, and a xylene-modified compound manufactured by Fudow Co., Ltd. (trade name: NIKANOL (registered trademark)) is exemplified as a commercially available product.

Other Examples

Other examples of the modified novolac-type phenolic resin expressed by Formula (1) include a phenol aralkyl resin and a biphenyl aralkyl resin.

A specific example of a phenol aralkyl resin is a resin obtained by reacting a phenol with p-xylylene glycol dimethyl ether in the presence of an acidic catalyst. The acidic catalyst may be exemplified by diethyl sulfate.

Another specific example of a phenol aralkyl resin is a resin obtained by reacting a phenol with divinylbenzene in the presence of an acidic catalyst. The acidic catalyst may be exemplified by p-toluenesulfonic acid.

A specific example of a biphenyl aralkyl resin is a resin obtained by reacting a phenol with bis(methoxymethyl)biphenyl in the presence of an acidic catalyst. The acidic catalyst may be exemplified by diethyl sulfate.

<Preparation of Resin-Adhered Graphite Particles>

In the production method according to aspects of the invention, first, the modified novolac-type phenolic resin is adhered to graphite particles. In this manner, obtained are resin-adhered graphite particles in which the modified novolac-type phenolic resin is adhered to surfaces of graphite particles.

<<Mixing>>

An example of a method for causing the modified novolac-type phenolic resin to be adhered to graphite particles is a method involving mixing graphite particles with the modified novolac-type phenolic resin.

The mixing method is not particularly limited, and an example thereof is a method in which graphite particles and the modified novolac-type phenolic resin being in a powder form or having been heated and melted into a liquid form are mixed using a kneader or another apparatus. In this step, a dispersion in which graphite particles are dispersed in a dispersion medium may be used. As a kneader, a pressure kneader or a two-roll mill, for example, may be used.

The modified novolac-type phenolic resin preferably takes on a powder form because it is easier to spread on surfaces of graphite particles. The average particle diameter ($D_{50}$) of the modified novolac-type phenolic resin in a powder form is not particularly limited and, for example, 1 to 50 μm.

<<Amount of Addition>>

An amount of the modified novolac-type phenolic resin to be added may vary depending on the residual carbon ratio of the modified novolac-type phenolic resin and is suitably exemplified by the following amounts.

In particular, an amount of the modified novolac-type phenolic resin to be added is preferably not less than 0.1 parts by mass, more preferably not less than 0.2 parts by mass and further preferably not less than 0.5 parts by mass with respect to 100 parts by mass of graphite particles. In this case, edge planes in graphite particles are sufficiently covered, leading to an excellent initial charging-discharging efficiency.

Meanwhile, an amount of the modified novolac-type phenolic resin to be added is preferably not more than 30.0 parts by mass, more preferably not more than 15.0 parts by mass, further preferably not more than 10.0 parts by mass and particularly preferably not more than 5.0 parts by mass with respect to 100 parts by mass of graphite particles. In this case, an inhibitive action of a coating where lithium is prevented from entering into and leaving from graphite particles is suppressed, leading to an excellent input-output property.

<Heating of Resin-Adhered Graphite Particles>

Next, the resin-adhered graphite particles are heated in a non-oxidizing atmosphere at 900 to 1,500° C. By this process, the modified novolac-type phenolic resin is carbonized to turn into a carbonaceous substance (carbonaceous coating). Accordingly, obtained are the carbonaceous substance-coated graphite particles in which at least part of surfaces of graphite particles is covered by a carbonaceous coating.

The heating temperature is not lower than 900° C. because the irreversible capacity of the carbonaceous coating is prevented from increasing, leading to an excellent initial charging-discharging efficiency, and is preferably not lower than 950° C. and more preferably not lower than 1,000° C. because this effect is more excellent.

On the other hand, the heating temperature is not higher than 1,500° C. because the crystallinity of the carbonaceous coating is prevented from increasing, leading to an excellent input-output property, and is preferably not higher than 1,300° C. and more preferably not higher than 1,200° C. because this effect is more excellent.

The heating time is preferably not less than one hour and more preferably not less than two hours. The upper limit thereof is not particularly limited and is, for example, 30 hours.

The heating atmosphere is a non-oxidizing atmosphere. This is because the carbonaceous coating would be burned and vanished in an oxidizing atmosphere. Examples of a non-oxidizing atmosphere include a nitrogen atmosphere, an argon atmosphere, a helium atmosphere and a vacuum atmosphere. A substantially non-oxidizing atmosphere may be achieved by placing, for example, coke breeze which oxidizes by itself and thereby decreasing an oxygen concentration in atmosphere.

Hereinbelow, the carbonaceous substance-coated graphite particles according to aspects of the invention may be referred to as "negative electrode material according to aspects of the invention."

[Negative Electrode for Lithium Ion Secondary Battery (Negative Electrode)]

A negative electrode for a lithium ion secondary battery according to aspects of the invention contains the negative electrode material according to aspects of the invention. The negative electrode for a lithium ion secondary battery is also simply referred to as "negative electrode."

The negative electrode according to aspects of the invention is prepared as with a normal negative electrode.

For preparation of the negative electrode, it is preferable to use a negative electrode mixture preliminarily prepared by adding a binder to the negative electrode material according to aspects of the invention. The negative electrode mixture may contain an active material or an electrically conductive material in addition to the negative electrode material according to aspects of the invention.

It is preferable that the binder is chemically and electrochemically stable against an electrolyte, and for the binder, use may be made of, for example, fluororesin such as polytetrafluoroethylene or polyvinylidene fluoride; resin such as polyethylene, polyvinyl alcohol, or styrene butadiene rubber; and carboxymethyl cellulose, while two or more of these can be used in combination.

The binder normally accounts for about 1 to 20 mass % of the total amount of the negative electrode mixture.

More specifically, first, the negative electrode material according to aspects of the invention is optionally adjusted to a desired particle size through classification or the like. Thereafter, the negative electrode material according to aspects of the invention is mixed with the binder, and the resulting mixture is dispersed in a solvent to prepare the negative electrode mixture in a paste form. Examples of the solvent include water, isopropyl alcohol, N-methylpyrrolidone, and dimethylformamide. In the mixing and dispersing processes, a known agitator, mixer, kneader or the like is used.

The prepared paste is applied on one or both of the surfaces of a current collector and dried. The coating weight is preferably 3 to 15 mg/cm$^2$ and more preferably 5 to 15 mg/cm$^2$. This process results in a negative electrode mixture layer (negative electrode) that is uniformly and firmly adhered to the current collector. The negative electrode mixture layer has a thickness of preferably 10 to 200 μm and more preferably 20 to 100 μm.

After the negative electrode mixture layer is formed, compression bonding such as press pressurization is performed, whereby the adhesion strength of the negative electrode mixture layer (negative electrode) to the current collector can be further improved.

The shape of the current collector is not particularly limited, and examples thereof include a foil-like shape, a mesh shape, and a net-like shape such as an expanded metal shape. The material of the current collector is preferably copper, stainless steel, nickel or the like. The current collector preferably has a thickness of about 5 to 20 μm in a case of a foil-like shape.

<Electrode-Coating Density>

The negative electrode according to aspects of the invention has the electrode-coating density of preferably not less than 1.10 g/cm$^3$ and more preferably not less than 1.20 g/cm$^3$, but preferably not more than 2.00 g/cm$^3$ and more preferably not more than 1.90 g/cm$^3$.

The electrode-coating density of the negative electrode is determined as described below.

A negative electrode having been punched out to have a given area is subjected to measurements of mass (with use of an electronic balance) and thickness (with use of a micrometer). Subsequently, 10 pieces of current collectors having been punched out to have the same area are subjected to measurement of mass, and their average value is treated as the mass of the current collector. Moreover, the thickness of the current collector is determined from the density of metal constituting the current collector. The electrode-coating density of the negative electrode is then determined according to the following equation.

Electrode coating density of negative electrode=
(mass of negative electrode−mass of current collector)/(thickness of negative electrode−thickness of current collector)×(punched out area)

[Lithium Ion Secondary Battery]

The lithium ion secondary battery according to aspects of the invention includes the negative electrode according to aspects of the invention and, in addition, components such as a positive electrode and a non-aqueous electrolyte. The lithium ion secondary battery according to aspects of the invention is constituted by, for example, a negative electrode, a non-aqueous electrolyte and a positive electrode superposed in this order and accommodated in an exterior material.

The type of the lithium ion secondary battery according to aspects of the invention can be arbitrarily selected from a cylindrical type, a square type, a coin type, a button type and other types, depending on the intended use, the device to which the battery is to be mounted, the required charging-discharging capacity.

<Positive Electrode>

For a material of the positive electrode (positive electrode active material), a material that can adsorb and store as well as release lithium in a sufficient amount is preferably selected. Examples of a positive electrode active material include, in addition to lithium, a lithium-containing compound such as a lithium-containing transition metal oxide, a transition metal chalcogenide, a vanadium oxide or a lithium compound thereof; a Chevrel phase compound expressed by Formula $M_xMo_6S_{8-Y}$ (where M represents at least one transition metal element, X is a numerical value in the range of $0 \leq X \leq 4$, and Y is a numerical value in the range of $0 \leq Y \leq 1$); activated carbon; and activated carbon fiber. The vanadium oxide is expressed by $V_2O_5$, $V_6O_{13}$, $V_2O_4$ or $V_3O_8$.

The lithium-containing transition metal oxide is a composite oxide of lithium and a transition metal, and lithium and two or more kinds of transition metals may be mixed to form a solid solution as the lithium-containing transition metal oxide. A single composite oxide may be used alone, or two or more composite oxides may be used in combination.

The lithium-containing transition metal oxide is specifically expressed by $LiM^1_{1-X}M^2_XO_2$ (where $M^1$ and $M^2$ represent at least one transition metal element, and X is a numerical value in the range of $0 \leq X \leq 1$) or $LiM^1_{1-Y}M^2_YO_4$ (where $M^1$ and $M^2$ represent at least one transition metal element, and Y is a numerical value in the range of $0 \leq X \leq 1$).

The transition metal element represented by $M^1$ and $M^2$ may be Co, Ni, Mn, Cr, Ti, V, Fe, Zn, Al, In or Sn, with Co, Fe, Mn, Ti, Cr, V and Al being preferred. Preferred examples include $LiCoO_2$, $LiNiO_2$, $LiMnO_2$, $LiNi_{0.9}Co_{0.1}O_2$, and $LiNi_{0.5}Co_{0.5}O_2$.

The lithium-containing transition metal oxide uses starting materials such as lithium, an oxide of a transition metal, a hydroxide and a salt and is obtained by mixing the starting materials according to the composition of the desired metal oxide, and baking the mixture in an oxygen atmosphere at temperature of 600 to 1,000° C.

As the positive electrode active material, any of the foregoing compounds may be used alone, or two or more thereof may be used in combination. For instance, a carbonate such as lithium carbonate can be added to the positive electrode. When the positive electrode is formed, various additives including an electrically conductive agent and a binder that are conventionally known can be suitably used.

The positive electrode is prepared by, for example, coating both surfaces of a current collector with a positive electrode mixture comprising a positive electrode active material, a binder, and an electrically conductive agent for imparting electrical conductivity to the positive electrode, thereby forming a positive electrode mixture layer.

As the binder, a binder used in preparation of a negative electrode can be used.

As the electrically conductive agent, a conventionally known electrically conductive agent such as a graphitized substance or carbon black is used.

The shape of the current collector is not particularly limited, and examples thereof include a foil-like shape and a net-like shape. The material of the current collector is aluminum, stainless steel, nickel or the like. The current collector preferably has a thickness of 10 to 40 μm.

As with the negative electrode, the positive electrode may be prepared by applying the positive electrode mixture in a paste form to the current collector, drying the applied positive electrode mixture, and performing compression bonding such as press pressurization.

<Non-Aqueous Electrolyte>

The non-aqueous electrolyte may be a liquid non-aqueous electrolyte (non-aqueous electrolytic solution), or a polyelectrolyte such as a solid electrolyte or a gel electrolyte.

As the non-aqueous electrolyte, use is made of a lithium salt which is an electrolyte salt used for an ordinary non-aqueous electrolytic solution, such as $LiPF_6$, $LiBF_4$, $LiAsF_6$, $LiClO_4$, $LiB(C_6H_5)$, $LiCl$, $LiBr$, $LiCF_3SO_3$, $LiCH_3SO_3$, $LiN(CF_3SO_2)_2$, $LiC(CF_3SO_2)_3$, $LiN(CF_3CH_2OSO_2)_2$, $LiN(CF_3CF_2OSO_2)_2$, $LiN(HCF_2CF_2CH_2OSO_2)_2$, $LiN((CF_3)_2CHOSO_2)_2$, $LiB[\{C_6H_3(CF_3)_2\}]_4$, $LiAlCl_4$, or $LiSiF_6$. From the oxidative stability point of view, $LiPF_6$ and $LiBF_4$ are preferred.

The electrolyte salt concentration in the non-aqueous electrolytic solution is preferably 0.1 to 5.0 mol/L and more preferably 0.5 to 3.0 mol/L.

Examples of a solvent used to prepare the non-aqueous electrolytic solution include a carbonate such as ethylene carbonate, propylene carbonate, dimethyl carbonate or diethyl carbonate; an ether such as 1,1- or 1,2-dimethoxyethane, 1,2-diethoxyethane, tetrahydrofuran, 2-methyltetrahydrofuran, γ-butyrolactone, 1,3-dioxolan, 4-methyl-1,3-dioxolan, anisole, or diethyl ether; a thioether such as sulfolane or methyl sulfolane; a nitrile such as acetonitrile, chloronitrile or propionitrile; and an aprotic organic solvent such as trimethyl borate, tetramethyl silicate, nitromethane, dimethylformamide, N-methylpyrolidone, ethyl acetate, trimethyl orthoformate, nitrobenzene, benzoyl chloride, benzoyl bromide, tetrahydrothiophene, dimethylsulfoxide, 3-methyl-2-oxazolidone, ethylene glycol, or dimethyl sulfite.

When the non-aqueous electrolyte is a polyelectrolyte such as a solid electrolyte or a gel electrolyte, a polymer gelated with a plasticizer (non-aqueous electrolytic solution) as a matrix is preferably used.

As a polymer constituting the matrix, use is suitably made of an ether-based polymer compound such as polyethylene oxide, or a crosslinked compound thereof; a poly(meth) acrylate-based polymer compound; or a fluorine-based polymer compound such as polyvinylidene fluoride, or vinylidene fluoride-hexafluoropropylene copolymer.

The non-aqueous electrolytic solution serving as a plasticizer has an electrolyte salt concentration of preferably 0.1 to 5.0 mol/L and more preferably 0.5 to 2.0 mol/L.

The plasticizer content in the polyelectrolyte is preferably 10 to 90 mass % and more preferably 30 to 80 mass %.

<Separator>

A separator can be also used in the lithium ion secondary battery according to aspects of the invention.

The material of the separator is not particularly limited, and use is made of, for example, woven fabric, non-woven fabric and a fine porous film made of synthetic resin. Among these, a fine porous film made of synthetic resin is preferred, and in particular a polyolefin-based fine porous film is more preferred in terms of the thickness, film strength, and film resistance. Suitable examples of the polyolefin-based fine porous film include a polyethylene fine porous film, a polypropylene fine porous film, and a composite fine porous film thereof.

Examples

Aspects of the present invention are specifically described below with reference to examples. However, the invention is not limited to the examples described below.

Example 1

<<Preparation of Carbonaceous Substance-Coated Graphite Particles>>

To 100 parts by mass of spherical natural graphite particles (particle diameter $D_{50}$: 10 μm), 8.0 parts by mass of a xylene-modified novolac-type phenolic resin A pulverized into a powder form by means of an impact mill (available from Sumitomo Bakelite Co., Ltd., particle diameter $D_{50}$: 34 μm, unmodified ratio: 0.72, weight average molecular weight: 19,800, residual carbon ratio: 34 mass %) was added, followed by mixing at 25° C. for 15 minutes using a drum-type mixer, whereby resin-adhered graphite particles were obtained.

The obtained resin-adhered graphite particles were put in a graphite container having a lid and heated with nitrogen flowing at 2 L/min (in a non-oxidizing atmosphere) at 1,200° C. for three hours using a tubular furnace, whereby carbonaceous substance-coated graphite particles were obtained.

Each of the physical properties of the obtained carbonaceous substance-coated graphite particles was determined according to the foregoing methods. The results are shown in Table 1 below.

<<Preparation of Negative Electrode>>

To water, 98 parts by mass of carbonaceous substance-coated graphite particles (negative electrode material), 1 part by mass of carboxymethylcellulose (binder) and 1 part by mass of styrene butadiene rubber (binder) were added, followed by agitation, whereby a negative electrode mixture paste was prepared.

The prepared negative electrode mixture paste was applied over copper foil in a uniform thickness and then dried in vacuum at 90° C., whereby a negative electrode mixture layer was formed. Next, the negative electrode mixture layer was pressurized at a pressure of 120 MPa by hand press. Thereafter, the copper foil and the negative electrode mixture layer were punched out into a circular shape with a diameter of 15.5 mm. A negative electrode adhered to a current collector made of copper foil (electrode-coating density: 1.50 g/cm³) was prepared in this manner.

<<Preparation of Positive Electrode>>

Lithium metal foil having been pressed against a nickel net was punched out into a circular shape with a diameter of 15.5 mm. A positive electrode comprising lithium metal foil adhered to a current collector made of a nickel net was prepared in this manner.

<<Preparation of Battery for Evaluation>>

As a battery for evaluation, a button-type secondary battery as illustrated in the FIGURE was prepared.

The FIGURE is a cross section of a button-type secondary battery for evaluation. In the button-type secondary battery illustrated in the FIGURE, circumferential portions of an exterior cup 1 and an exterior can 3 are swaged with an insulating gasket 6 being interposed therebetween, whereby a tightly sealed structure is formed. Inside the tightly sealed structure, a current collector 7a, a positive electrode 4, a separator 5, a negative electrode 2 and a current collector 7b are superposed in this order from the inner surface of the exterior can 3 toward the inner surface of the exterior cup 1.

The button-type secondary battery illustrated in the FIGURE was prepared as described below.

First, into a mixed solvent comprising ethylene carbonate (33 vol %) and methylethyl carbonate (67 vol %), $LiPF_6$ was dissolved at a concentration of 1 mol/L, whereby the non-aqueous electrolytic solution was prepared. A polypropylene porous body (thickness: 20 μm) was impregnated with the prepared non-aqueous electrolytic solution, whereby the separator 5 impregnated with the non-aqueous electrolytic solution was prepared.

Next, the prepared separator 5 was held between the negative electrode 2 adhered to the current collector 7b made of copper foil and the positive electrode 4 adhered to the current collector 7a made of a nickel net to be laminated. Thereafter, the current collector 7b and the negative electrode 2 were accommodated in the exterior cup 1, while the current collector 7a and the positive electrode 4 were accommodated in the exterior can 3, and the exterior cup 1 and the exterior cup 3 were put together. In addition, the circumferential portions of the exterior cup 1 and the exterior can 3 were swaged to be tightly sealed, with the insulating gasket 6 being interposed therebetween. The button-type secondary battery was prepared in this manner.

Using the prepared button-type secondary battery (battery for evaluation), the battery properties were evaluated though the charging-discharging test described below. The results are shown in Table 1 below.

In the below charging-discharging test, the process in which lithium ions are adsorbed and stored in the negative electrode material is assumed as charging, and the process in which lithium ions are released from the negative electrode material is assumed as discharging.

<<Charging-Discharging Test: Initial Discharging Capacity, Initial Charging-Discharging Loss and Initial Charging-Discharging Efficiency>>

First, constant-current charging at the current value of 0.9 mA was performed until the circuit voltage reached 0 mV. When the circuit voltage reached 0 mV, the constant-current charging was changed to constant-voltage charging, and the charging was continued until the current value reached 20 μA. Based on an amount of current carried during this process, the charging capacity (also referred to as "initial charging capacity") (unit: mAh) was determined. Thereafter, the battery was rested for 120 minutes. Next, constant-current discharging at the current value of 0.9 mA was performed until the circuit voltage reached 1.5 V. Based on an amount of current curried during this process, the discharging capacity (also referred to as "initial discharging capacity") (unit: mAh) was determined. These processes were treated as one cycle.

The initial charging-discharging loss (unit: mAh/g) and the initial charging-discharging efficiency (unit: %) were determined according to the following equations.

Initial charging-discharging loss=initial charging capacity−initial discharging capacity Initial charging-discharging efficiency=(initial discharging capacity/initial charging capacity)×100

<<Charging-Discharging Test: Cycle Characteristic>>

A button-type secondary battery was prepared in the same manner as the foregoing except that a positive electrode comprising $LiCoO_2$ (93 mass %), an electrically conductive agent (4 mass %) and a binder (3 mass %) was used. Scale-like graphite particles and styrene butadiene rubber were used as the electrically conductive agent and the binder, respectively.

Using the prepared button-type secondary battery, the cycle characteristic was evaluated though the charging-discharging test described below.

Constant-current charging was performed at the current value of 1C until the circuit voltage reached 1 mV and was thereafter changed to constant-voltage charging. The charging was kept until the current value reached 20 μA. Based on an amount of current carried during this process, the charging capacity (unit: mAh) was determined. Thereafter, the battery was rested for 10 minutes. Next, constant-current discharging was performed at the current value of 2C until the circuit voltage reached 1.5 V. Based on an amount of current carried during this process, the discharging capacity (unit: mAh) was determined. This charging-discharging operation was repeated 100 times, and the cycle characteristic (unit: %) was determined using the obtained discharging capacities according to the following equation:

Cycle characteristic=100×(Discharging capacity of 100th cycle/Discharging capacity of 1st cycle)

Example 2

Carbonaceous substance-coated graphite particles were prepared in the same manner as in Example 1 except that an amount of the xylene-modified novolac-type phenolic resin A added with respect to 100 parts by mass of spherical natural graphite particles was changed to 5.0 parts by mass, and were evaluated. The results are shown in Table 1 below.

Example 3

Carbonaceous substance-coated graphite particles were prepared in the same manner as in Example 1 except that an amount of the xylene-modified novolac-type phenolic resin A added with respect to 100 parts by mass of spherical natural graphite particles was changed to 1.5 parts by mass, and were evaluated. The results are shown in Table 1 below.

Example 4

Carbonaceous substance-coated graphite particles were prepared in the same manner as in Example 1 except that the particle diameter $D_{50}$ of spherical natural graphite particles was 8 μm and that an amount of the xylene-modified novolac-type phenolic resin A added with respect to 100 parts by mass of spherical natural graphite particles was changed to 8.5 parts by mass, and were evaluated. The results are shown in Table 1 below.

Example 5

Carbonaceous substance-coated graphite particles were prepared in the same manner as in Example 1 except that the particle diameter $D_{50}$ of spherical natural graphite particles was 8 μm and that an amount of the xylene-modified novolac-type phenolic resin A added with respect to 100 parts by mass of spherical natural graphite particles was changed to 10.5 parts by mass, and were evaluated. The results are shown in Table 1 below.

Example 6

To 100 parts by mass of spherical natural graphite particles (particle diameter $D_{50}$: 8 μm), 7.6 parts by mass of a xylene-modified novolac-type phenolic resin B pulverized into a powder form by means of an impact mill (available from Sumitomo Bakelite Co., Ltd., particle diameter $D_{50}$: 28 µm, unmodified ratio: 0.85, weight average molecular weight: 1,646, residual carbon ratio: 38 mass %) was added, followed by mixing at 25° C. for 15 minutes using a drum-type mixer, whereby resin-adhered graphite particles were obtained.

Thereafter, carbonaceous substance-coated graphite particles were prepared in the same manner as in Example 1, and were evaluated. The results are shown in Table 1 below.

Example 7

To 100 parts by mass of spherical natural graphite particles (particle diameter $D_{50}$: 8 µm), 12.6 parts by mass of a xylene-modified novolac-type phenolic resin C pulverized into a powder form by means of an impact mill (available from Sumitomo Bakelite Co., Ltd., particle diameter $D_{50}$: 30 µm, unmodified ratio: 0.48, weight average molecular weight: 635, residual carbon ratio: 23 mass %) was added, followed by mixing at 25° C. for 15 minutes using a drum-type mixer, whereby resin-adhered graphite particles were obtained.

Thereafter, carbonaceous substance-coated graphite particles were prepared in the same manner as in Example 1, and were evaluated. The results are shown in Table 1 below.

Example 8

Carbonaceous substance-coated graphite particles were prepared in the same manner as in Example 1 except that the particle diameter $D_{50}$ of spherical natural graphite particles was 15 µm and that an amount of the xylene-modified novolac-type phenolic resin A added with respect to 100 parts by mass of spherical natural graphite particles was changed to 10.5 parts by mass, and were evaluated. The results are shown in Table 1 below.

Example 9

To 100 parts by mass of spherical natural graphite particles (particle diameter $D_{50}$: 8 µm), 10 parts by mass of a xylene-modified novolac-type phenolic resin D pulverized into a powder form by means of an impact mill (available from Sumitomo Bakelite Co., Ltd., particle diameter $D_{50}$: 30 µm, unmodified ratio: 0.72, weight average molecular weight: 2,610, residual carbon ratio: 29 mass %) was added, followed by mixing at 25° C. for 15 minutes using a drum-type mixer, whereby resin-adhered graphite particles were obtained.

Thereafter, carbonaceous substance-coated graphite particles were prepared in the same manner as in Example 1, and were evaluated. The results are shown in Table 1 below.

Example 10

To 100 parts by mass of spherical natural graphite particles (particle diameter $D_{50}$: 8 µm), 8.3 parts by mass of a xylene-modified novolac-type phenolic resin E pulverized into a powder form by means of an impact mill (available from Sumitomo Bakelite Co., Ltd., particle diameter $D_{50}$: 30 µm, unmodified ratio: 0.72, weight average molecular weight: 99,734, residual carbon ratio: 35 mass %) was added, followed by mixing at 25° C. for 15 minutes using a drum-type mixer, whereby resin-adhered graphite particles were obtained.

Thereafter, carbonaceous substance-coated graphite particles were prepared in the same manner as in Example 1, and were evaluated. The results are shown in Table 1 below.

Comparative Example 1

To 100 parts by mass of spherical natural graphite particles (particle diameter $D_{50}$: 15 µm), 6.3 parts by mass of an unmodified novolac-type phenolic resin F pulverized into a powder form by means of an impact mill (available from Sumitomo Bakelite Co., Ltd., particle diameter $D_{50}$: 33 µm, unmodified ratio: 1.00, weight average molecular weight: 13,100, residual carbon ratio: 48 mass %) was added, followed by mixing at 25° C. for 15 minutes using a drum-type mixer, whereby resin-adhered graphite particles were obtained.

Thereafter, carbonaceous substance-coated graphite particles were prepared in the same manner as in Example 1, and were evaluated. The results are shown in Table 2 below.

Comparative Example 2

Carbonaceous substance-coated graphite particles were prepared in the same manner as in Comparative Example 1 except that an amount of the unmodified novolac-type phenolic resin F added with respect to 100 parts by mass of spherical natural graphite particles was changed to 10.4 parts by mass, and were evaluated. The results are shown in Table 2 below.

Comparative Example 3

Carbonaceous substance-coated graphite particles were prepared in the same manner as in Comparative Example 1 except that the particle diameter $D_{50}$ of spherical natural graphite particles was 8 µm and that an amount of the unmodified novolac-type phenolic resin F added with respect to 100 parts by mass of spherical natural graphite particles was changed to 10.4 parts by mass, and were evaluated. The results are shown in Table 2 below.

Comparative Example 4

To 100 parts by mass of spherical natural graphite particles (particle diameter $D_{50}$: 15 µm), 8.3 parts by mass of a resol-type phenolic resin G (available from Sumitomo Bakelite Co., Ltd., weight average molecular weight: 945, residual carbon ratio: 36 mass %) was added, followed by mixing at 25° C. for 30 minutes using a biaxial kneader, whereby resin-adhered graphite particles were obtained.

Thereafter, carbonaceous substance-coated graphite particles were prepared in the same manner as in Example 1, and were evaluated. The results are shown in Table 2 below.

Comparative Example 5

To 100 parts by mass of spherical natural graphite particles (particle diameter $D_{50}$: 8 µm), 3.0 parts by mass of a coal-based high softening point pitch H (available from JFE Chemical Corporation, residual carbon ratio: 70 mass %) was added, followed by mixing at 25° C. for 15 minutes using a drum-type mixer, whereby resin-adhered graphite particles were obtained.

Thereafter, carbonaceous substance-coated graphite particles were prepared in the same manner as in Example 1, and were evaluated. The results are shown in Table 2 below.

Comparative Example 6

To 100 parts by mass of spherical natural graphite particles (particle diameter $D_{50}$: 10 μm), 7.0 parts by mass of the coal-based high softening point pitch H (available from JFE Chemical Corporation, residual carbon ratio: 70 mass %) was added, followed by mixing at 25° C. for 15 minutes using a drum-type mixer, whereby resin-adhered graphite particles were obtained.

Thereafter, carbonaceous substance-coated graphite particles were prepared in the same manner as in Example 1, and were evaluated. The results are shown in Table 2 below.

TABLE 1

| | Graphite particles $D_{50}$ [μm] | phenolic resin | | | | | Carbonaceous substance-coated graphite particles | | |
|---|---|---|---|---|---|---|---|---|---|
| | | Type | $D_{50}$ [μm] | Unmodified ratio | Weight average molecular weight | Added amount [parts by mass] | Amount of carbonaceous coating [parts by mass] | $D_{50}$ [μm] | $S_{BET}$ [m²/g] | SAa [m²/g] |
| EX 1 | 10 | Xylene-modified novolac-type phenolic resin A | 34 | 0.72 | 19800 | 8.0 | 2.7 | 12.3 | 8.9 | 7.77 |
| EX 2 | 10 | Xylene-modified novolac-type phenolic resin A | 34 | 0.72 | 19800 | 5.0 | 1.7 | 11.9 | 7.4 | 5.42 |
| EX 3 | 10 | Xylene-modified novolac-type phenolic resin A | 34 | 0.72 | 19800 | 1.5 | 0.5 | 12.0 | 7.0 | 4.72 |
| EX 4 | 8 | Xylene-modified novolac-type phenolic resin A | 34 | 0.72 | 19800 | 8.5 | 2.9 | 9.2 | 8.2 | 6.90 |
| EX 5 | 8 | Xylene-modified novolac-type phenolic resin A | 34 | 0.72 | 19800 | 10.5 | 3.6 | 9.9 | 9.1 | 9.16 |
| EX 6 | 8 | Xylene-modified novolac-type phenolic resin B | 28 | 0.85 | 1646 | 7.6 | 2.9 | 8.0 | 12.1 | 11.9 |
| EX 7 | 8 | Xylene-modified novolac-type phenolic resin C | 30 | 0.48 | 635 | 12.6 | 2.9 | 7.8 | 4.4 | 3.70 |
| EX 8 | 15 | Xylene-modified novolac-type phenolic resin A | 34 | 0.72 | 19800 | 10.5 | 3.6 | 15.9 | 5.8 | 5.93 |
| EX 9 | 8 | Xylene-modified novolac-type phenolic resin D | 30 | 0.72 | 2610 | 10 | 2.9 | 8.0 | 6.7 | 5.7 |
| EX 10 | 8 | Xylene-modified novolac-type phenolic resin E | 30 | 0.72 | 99734 | 8.3 | 2.9 | 9.1 | 7.8 | 5.97 |

| | Carbonaceous substance-coated graphite particles | | | | | Battery properties | | | | |
|---|---|---|---|---|---|---|---|---|---|---|
| | SAb [m²/g] | SAb/ SAa | $d_{002}$ [nm] | La (110) [nm] | Raman R value | Coated electrode density [g/cm³] | Initial discharging capacity [mAh/g] | Initial charging-discharging loss [mAh/g] | Initial charging-discharging efficiency [%] | Cycle characteristic [%] |
| EX 1 | 3.05 | 0.39 | 0.3354 | 492 | 0.19 | 1.50 | 360 | 24 | 93.7 | 92.0 |
| EX 2 | 3.63 | 0.67 | 0.3356 | 678 | 0.19 | 1.50 | 362 | 25 | 93.6 | 91.1 |
| EX 3 | 4.54 | 0.96 | 0.3356 | 534 | 0.19 | 1.50 | 363 | 27 | 93.1 | 90.0 |
| EX 4 | 4.37 | 0.63 | 0.3357 | 245 | 0.24 | 1.50 | 362 | 28 | 92.7 | 92.0 |
| EX 5 | 4.00 | 0.44 | 0.3357 | 479 | 0.24 | 1.50 | 359 | 30 | 92.4 | 92.5 |
| EX 6 | 2.80 | 0.24 | 0.3356 | 389 | 0.25 | 1.50 | 361 | 31 | 92.0 | 91.3 |
| EX 7 | 4.70 | 1.27 | 0.3356 | 214 | 0.26 | 1.50 | 364 | 34 | 92.3 | 92.0 |
| EX 8 | 1.82 | 0.31 | 0.3357 | 769 | 0.25 | 1.50 | 359 | 25 | 93.5 | 93.5 |
| EX 9 | 2.32 | 0.40 | 0.3356 | 639 | 0.25 | 1.50 | 363 | 32 | 91.9 | 92.1 |
| EX 10 | 4.12 | 0.69 | 0.3355 | 185 | 0.23 | 1.50 | 365 | 34 | 92.1 | 91.9 |

EX: Example

TABLE 2

| | Graphite particles $D_{50}$ [μm] | phenolic resin or pitch | | | | | Carbonaceous substance-coated graphite particles | | | |
|---|---|---|---|---|---|---|---|---|---|---|
| | | Type | $D_{50}$ [μm] | Unmodified ratio | Weight average molecular weight | Added amount [parts by mass] | Amount of carbonaceous coating [parts by mass] | $D_{50}$ [μm] | $S_{BET}$ [m²/g] | SAa [m²/g] |
| CE 1 | 15 | Unmodified novolac-type phenolic resin F | 33 | 1.00 | 13100 | 6.3 | 3.0 | 16.6 | 15.8 | 16.0 |
| CE 2 | 15 | Unmodified novolac-type phenolic resin F | 33 | 1.00 | 13100 | 10.4 | 5.0 | 17.3 | 35.5 | 39.6 |
| CE 3 | 8 | Unmodified novolac-type phenolic resin F | 33 | 1.00 | 13100 | 10.4 | 5.0 | 9.4 | 13.4 | 13.0 |
| CE 4 | 15 | Resol-type phenolic resin G | — | 1.00 | 945 | 8.3 | 3.0 | 15.8 | 18.9 | 16.0 |
| CE 5 | 8 | Coal-based pitch H | 30 | — | — | 3.0 | 2.1 | 10.0 | 6.3 | 4.2 |
| CE 6 | 10 | Coal-based pitch H | 30 | — | — | 7.0 | 4.9 | 12.5 | 4.3 | 2.7 |

| | Carbonaceous substance-coated graphite particles | | | | | Battery properties | | | | |
|---|---|---|---|---|---|---|---|---|---|---|
| | SAb [m²/g] | SAb/ SAa | $d_{002}$ [nm] | La (110) [nm] | Raman R value | Coated electrode density [g/cm³] | Initial discharging capacity [mAh/g] | Initial charging-discharging loss [mAh/g] | Initial charging-discharging efficiency [%] | Cycle characteristic [%] |
| CE 1 | 4.20 | 0.26 | 0.3357 | 250 | 0.18 | 1.50 | 363 | 35 | 91.3 | 88.0 |
| CE 2 | 1.00 | 0.03 | 0.3358 | 280 | 0.22 | 1.50 | 358 | 53 | 87.1 | 89.2 |
| CE 3 | 3.90 | 0.30 | 0.3357 | 428 | 0.20 | 1.50 | 360 | 37 | 90.7 | 86.5 |
| CE 4 | 3.10 | 0.19 | 0.3357 | 330 | 0.18 | 1.50 | 363 | 38 | 90.6 | 85.6 |
| CE 5 | 6.00 | 1.42 | 0.3358 | 205 | 0.30 | 1.50 | 365 | 39 | 90.3 | 87.0 |
| CE 6 | 3.77 | 1.40 | 0.3357 | 256 | 0.30 | 1.50 | 360 | 36 | 90.9 | 89.0 |

CE: Comparative Example

<Summary of Evaluation Results>

As shown in Tables 1 and 2 above, Examples 1 to 10 using a xylene-modified novolac-type phenolic resin exhibited excellent battery properties, as compared to Comparative Examples 1 to 6 where a xylene-modified novolac-type phenolic resin was not used.

Specifically, in Examples 1 to 10, the initial charging-discharging loss was small, the initial charging-discharging efficiency yielded a large value which was good, and the cycle characteristic yielded a large value which was good, as compared to Comparative Examples 1 to 6.

REFERENCE SIGNS LIST

1: exterior cup
2: negative electrode
3: exterior can
4: positive electrode
5: separator
6: insulating gasket
7a: current collector
7b: current collector

The invention claimed is:

1. A method for producing carbonaceous substance-coated graphite particles, the method comprising:
   obtaining resin-adhered graphite particles by causing a modified novolac-type phenolic resin to adhere to graphite particles; and
   coating at least part of surfaces of the graphite particles with a carbonaceous coating by heating the resin-adhered graphite particles in a non-oxidizing atmosphere at 900 to 1,500° C. to carbonize the modified novolac-type phenolic resin,
   wherein arylene groups having hydroxy groups account for 5 to 95 mol % of arylene groups constituting the modified novolac-type phenolic resin, and
   wherein in the carbonaceous substance-coated graphite particles,
   an amount of carbonaceous coating is in a range of 0.1 to 15.0 parts of mass, with respect to 100 parts of mass of graphite particle,
   a particle diameter $D_{50}$ is 3.0 to 20.0 μm,
   a specific surface area determined by BET method is 4.0 to 15.0 m²/g,
   a pore specific surface area SAa of pores having pore sizes of 1 to 4 nm determined by BJH method is 1.85 to 12.50 m²/g, and a ratio of a pore specific surface area SAb of pores having pore sizes of 4 to 150 nm determined by BJH method to the pore specific surface area SAa (SAb/SAa) is 0.20 to 1.29.

2. The method for producing carbonaceous substance-coated graphite particles according to claim 1, wherein the modified novolac-type phenolic resin is expressed by Formula (1) below:

[Chemical Formula 1]

(1)

where P represents an arylene group having a hydroxy group, X represents an arylene group having no hydroxy group, and m and n each independently represent an integer of 1 or more, with a value of m/(m+n) being 0.05 to 0.95.

3. The method for producing carbonaceous substance-coated graphite particles according to claim 2, wherein the modified novolac-type phenolic resin is a xylene- modified novolac-type phenolic resin, in which P and X in Formula (1) represent a hydroxyphenylene group and a dimethylphenylene group, respectively.

* * * * *

UNITED STATES PATENT AND TRADEMARK OFFICE
CERTIFICATE OF CORRECTION

PATENT NO. : 11,942,641 B2
APPLICATION NO. : 17/430430
DATED : March 26, 2024
INVENTOR(S) : Ryuta Haga et al.

Page 1 of 1

It is certified that error appears in the above-identified patent and that said Letters Patent is hereby corrected as shown below:

In the Claims

Column 22, Line 60 In Claim 1, before "mass," delete "of" and insert -- by --.

Column 22, Line 60 In Claim 1, before "mass" delete "of" and insert -- by --.

Column 22, Line 61 In Claim 1, delete "particle," and insert -- particles, --.

Column 22, Line 67 In Claim 1, delete "$m^{2/}g$," and insert -- $m^2/g$, --.

Signed and Sealed this
Eighteenth Day of June, 2024

Katherine Kelly Vidal
*Director of the United States Patent and Trademark Office*